United States Patent
Ng et al.

(10) Patent No.: US 7,603,375 B2
(45) Date of Patent: Oct. 13, 2009

(54) SYSTEM AND METHOD FOR GENERATING A CUSTOM APPLICATION

(75) Inventors: Bobby Ng, San Ramon, CA (US); Matthew Grumbach, Foster City, CA (US); Alex Warshavsky, San Francisco, CA (US); Ashwin Kashyap, San Francisco, CA (US); Patrick Lu, San Mateo, CA (US); Rita Chang, Hayward, CA (US); Wenzhi Lai, El Cerrito, CA (US); Peklui Cheng, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 380 days.

(21) Appl. No.: 11/095,443

(22) Filed: Mar. 30, 2005

(65) Prior Publication Data

US 2007/0226241 A1   Sep. 27, 2007

(51) Int. Cl.
   *G06F 17/30*   (2006.01)
(52) U.S. Cl. .................... 707/102; 707/100; 707/103 Y; 707/104.1; 707/200
(58) Field of Classification Search .............. 707/1, 707/100, 102, 103 R, 103 Y, 103 X, 104.1, 707/200, 201, 203; 717/103, 106, 110, 168, 717/170
   See application file for complete search history.

(56) References Cited

U.S. PATENT DOCUMENTS

| | | | | |
|---|---|---|---|---|
| 5,412,772 | A * | 5/1995 | Monson ...................... | 715/746 |
| 6,018,627 | A * | 1/2000 | Iyengar et al. .............. | 717/103 |
| 6,226,637 | B1 * | 5/2001 | Carey et al. ................. | 707/4 |
| 2002/0184610 | A1 * | 12/2002 | Chong et al. ............... | 717/109 |
| 2004/0187090 | A1 * | 9/2004 | Meacham ................... | 717/103 |
| 2005/0021756 | A1 * | 1/2005 | Grant ......................... | 709/226 |

OTHER PUBLICATIONS

Bowstreet, "Bowstreet Portlet Factory for WebSphere: Technical Whitepaper," 29 pgs. (Updated Oct. 22, 2004).
"Bowstreet™ Portlet Factory for Websphere®," Bowstreet, 4 pgs. (2005).
"Bowstreet® Portlet Factory," Bowstreet, 4 pgs. (2005).
"Bowstreet—Overview," Bowstreet, http://www.bowstreet.com/toolsandtechnology/index.html, 2 pgs. (2005).
"Bowstreet—Bowstreet Portlet Factory," Bowstreet, http://www.bowstreet.com/toolsandtechnology/portletfactory/index.html, 2 pgs. (2005).
"Bowstreet—Bowstreet Portlet Factory for WebSphere," Bowstreet, http://www.bowstreet.com/toolsandtechnology/portletfactory/websphere.html, 3 pgs. (2005).
"Bowstreet—Bowstreet Portlet Factory," Bowstreet, http://www.bowstreet.com/toolsandtechnology/portletfactory/jsr168.html, 2 pgs. (2005).
"Bowstreet—Bowstreet Portlet Factory for ISVs," Bowstreet, http://www.bowstreet.com/toolsandtechnology/portletfactory.isv.html, 2 pgs. (2005).

(Continued)

*Primary Examiner*—Cam-Linh Nguyen
(74) *Attorney, Agent, or Firm*—Campbell Stephenson LLP

(57) ABSTRACT

Systems and methods for generating a custom application are disclosed. In one embodiment, a request to generate an application for modifying a database may be received. In response to the request, the application may be generated based on a previously defined view of another database, e.g. a repository containing metadata describing the database. Services (e.g. network services) may be validated and files (e.g. sample server pages, library files and instructional files) may be generated for customization.

21 Claims, 15 Drawing Sheets

OTHER PUBLICATIONS

Figure 1:
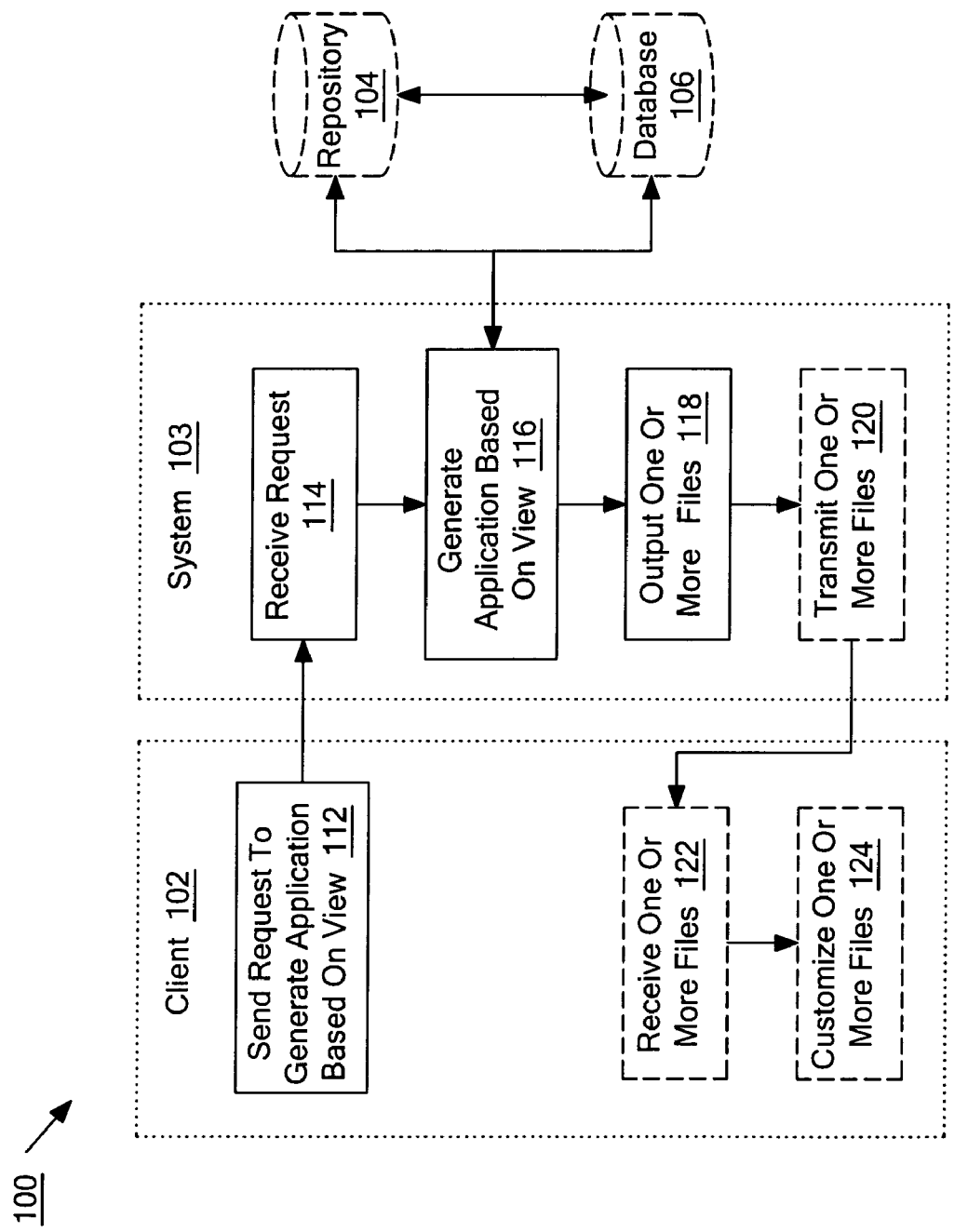

"Bowstreet—Factory Achitecture," Bowstreet, http://www.bowstreet.com/toolsandtechnology/technologyadvantages/architecture.html, 2 pgs. (2005).

"Bowstreet—Components," Bowstreet, http://www.bowstreet.com/toolsandtechnology/technologyadvantages/components.html, 2 pgs. (2005).

* cited by examiner

| W | Name | Changed |
|---|------|---------|
|   | Account Detail - Bill To Ship To (SCW) | |
|   | Account Detail - Business Address View | |
|   | Account Detail - Contact User Admin View | |
| ⋀ | Account Detail - Contact View | |
|   | Account Detail - Contact View ( | New Record |
|   | Account Detail - Credit Profile Vi | Delete Record |
|   | Account Detail - Opportunities V | Copy Record |
|   | Account Detail - Opportunities V | Undo Record |
|   | Account Detail - Orders View | Column Displayed... |
|   | Account Detail - Orders View (Sc | Sort Order... |
|   | Account Detail - Projects View | Compile Selected Objects... |
|   | Account Detail - Projects View (S | Edit Web Layout |
|   | Account Detail - Quotes View (S | Web Layout Wizard... |
|   | Account Detail - Revenue Sched | Compare Objects ▲ |
|   | Account Detail - Revenue Sched | View Web Hierarchy |
|   | Account Detail - Revenue Sched | Add To Archive... |
|   | Account Detail - Revenue Sched | Validate... |
|   | Account Detail - Service Reques | Generate UI Kit |
|   | Account Detail View | |
|   | Account Detail View (SCW) | |

Start Wizard 402

FIG. 4B

Select Applet(s) 404

Specify Or Create New Network Service(s) 406, 408

Specify or create new data service(s) 410, 412

Request approval to modify repository 422

Select platform and file storage location 424

Generate files; place in file storage location 426

```
string Login (HttpServletRequest request, HttpServletRespo
{
    String strUserName = request.getParameter ("userName");
    String strPassword = request.getParameter ("password");
    SessionAccessService service = new SessionAccessService(
    boolean successful = service. login(strUserName, strPassw if (successful)
    {
        // Forward to the start action.
        return ShowStartPage (request, response);
    }
    else
    {
        // Forward to the login page.
        request.setAttribute("errorMsg", "Invalid login");
        return ("/All_Account_List_View/" + "login.jsp");
    }
}
```

Sample JSP Page 502

FIG. 5A

Account list view applet 504

| Account List | | | | |
|---|---|---|---|---|
| New \| Query | | | | |
| | | Previous \| Next | | |
| Account Name ▲ | Location | Priority | Account Type |
| Action Rentals | HQ | Low | Prospect |
| Bay Construction | HQ | Medium | Customer |
| Bay Demolition Services | HQ | High | Customer |
| Bergen Equipment & Scoffolding | HQ | Low | Prospect |
| Bighorn Materials | HQ | High | Customer |
| Bobcat Loaders & Excavators | HQ | Medium | Customer |

FIG. 5B

Account List

[New] [Query]

| Account Name | Site | Main Phone # | URL |
|---|---|---|---|
| Toys R Us | Chicago | 5551267 | http://www.toysrus.com |
| Fidelity | New York | 5559884 | http://www.fidelity.com |
| Epiphany | San Mateo | 5552158 | http://www.epiphany.com |

Previous | Next

FIG. 6A

FIG. 6B

Address: http://localhost:8080/view1/AccountView.jsp?cmd=Drilldown&r ▶ → GO  Links >>

Account Detail  Back

Account Details | New | Edit | Delete |

Key Account Information:

Account Name: Toys R Us    Site: Chicago
Competitor: ☐
Currency: USD

Local intranet

| Address | http://localhost:8080/view1/AccountView.jsp?cmd=Edit&rowID: | → | GO | Links >> |

Update Account

Account Details | Save | Cancel

Name* | Toys R Us
Site | Chicago
Competitor | ☐
Currency | USD

* = Required Field

FIG. 6C

SYSTEM AND METHOD FOR GENERATING A CUSTOM APPLICATION

TECHNICAL FIELD

The field relates generally to generating an application, and in particular, to generating an application capable of modifying a database based upon a previously defined view of a repository.

BACKGROUND

Businesses are continually trying to improve the services that they provide to their customers. To better address their customer needs, businesses often provide "customer service departments." These departments typically employ individuals (sometimes referred to as "agents" or "representatives") who answer questions, inquiries, complaints and/or other sales and service issues. At a most basic form, an agent communicates with customers via a telephone to orally answer sales/service inquiries of customers who call the customer service department.

Customer relationship management (CRM) systems have become popular in recent years to automate interactions between businesses and customers. Using hardware and software, many tasks traditionally performed by agents may be performed electronically. For instance, customers may listen to prerecorded messages in automated voicemail systems (a form of CRM) and make menu selections using a telephone keypad.

However, businesses, products, and customers may vary greatly from one situation to another. What works very well for one business may not work as well for another. Given this, CRM systems are often customized for each business. This customization may be expensive and lengthy, involving several groups of individuals to provide to businesses with, for example, customized software code, customized hardware, customized applications, and the like.

For example, to allow a business to access client account information via the web, a web application customization may involve a web application developer, a web designer and a database application developer. The web application developer may be responsible for taking business requirements and for developing the complete web application. The web application developer may ask a web designer to create a user interface (UI) mock up.

The web application developer or the designer may be familiar with web development. Either may create files using hypertext markup language (HTML), Active Server Page (ASP) and/or JavaServer Page (JSP) scripting, for example. However, most web application developers and web designers are unfamiliar with the configuration of underlying database(s) and/or database application(s) (e.g. a CRM application) that may provide information and functionality relevant to the application. Therefore, a third group of developers, e.g. database application developers, often help create the custom application.

The database application developer may reconfigure database(s) and/or database application(s) to meet the specific business requirements. For example, a database application developer may configure and/or create templates, applets, repository views, business objects, business components, data services and network services. To accomplish these tasks, the database application developer is usually specially trained in skills specifically relating to a particular database and/or database application. For example, a Siebel® application developer may be trained to work with eScript/Siebel VB™, BrowserScript™, Siebel® object configurations and Siebel® templates.

Once the database(s) and/or the database application(s) are configured and useful interfaces or objects created, the database application developer may then communicate instructions to the web application developer on how to access the interfaces and/or objects. Using these interfaces and objects, the web application developer may create a front end (e.g. a GUI) to provide user access to the database.

This customization process may take weeks, if not months, causing delays in deployment of the application. For example, the web application developer may be unfamiliar with new and/or existing database application interfaces, as well as with the database(s) structure. This unfamiliarity may make it difficult to request the proper modifications. This unfamiliarity may also add development time to allow the web developer to learn how to access and interact with the interfaces in the application code. Even if a web application developer is familiar with the interfaces, the developer may have to write and debug code to create the proper custom application.

Also adding to deployment time is the database application developer's tasks of configuring the database application to support the custom application, e.g. modifying an existing feature, adding a feature, updating a component, installing components, or the like. Thus, what is needed is an improved system and method for generating a custom application.

BRIEF DESCRIPTION OF THE DRAWINGS

FIG. 1 is a diagram of a system and method for generating a custom application in accordance with one embodiment of this invention.

FIG. 2 is a diagram of part of the system of FIG. 1 in accordance with one embodiment of this invention.

FIG. 3 is a diagram of relationships between components of a system that used in accordance with one embodiment of this invention.

FIG. 4A is a flowchart of a user interface for generating a custom application in accordance with one embodiment of this invention.

FIG. 4B-4H are screenshots of various points in the flowchart of FIG. 4A in accordance with embodiments of this invention.

FIG. 5A is a screenshot of a file generated in accordance with one embodiment of this invention.

FIG. 5B is a screenshot of a portion of the file of FIG. 5A when executed by a processor in accordance with one embodiment of this invention.

FIGS. 6A-6C are consecutive screenshots of an application generated in accordance with one embodiment of this invention.

FIG. 7 is a diagram of a system for generating a custom application in accordance with one embodiment of this invention.

FIG. 8 is a diagram of a system for generating a custom application in accordance with another embodiment of this invention.

DETAILED DESCRIPTION

Systems and methods for generating a custom application are disclosed. Generally, using a previously defined view of a repository an application for modifying a database is generated.

The repository contains data describing the database. A view of a repository is a presentation of the repository, e.g. as seen by a user. A repository is often associated with a plurality of views, each view presenting in a different manner data stored in a certain database. For example, FIG. 4B is shows a list of various views (e.g. the view labeled "Account Detail—Contacts View") defined in a CRM repository that stores metadata describing a user database.

In generating the application, services (e.g. web services and data services) are validated and/or created. Additionally, files may also be automatically generated, e.g. a sample code file. These files may expedite deployment time by allowing a developer to leverage code, instructions, or the like in the files. The files may also provide full data operation capabilities, including creating, updating, deleting, and querying records in the database. These files may be transferred to another system for customization and/or deployment. In certain embodiments, to generate the custom application, including these files, a user may activate a wizard and specify a repository view. The files may be created in response to selections determined using the wizard.

FIG. 1 is a diagram of a system and method for generating a custom application in accordance with one embodiment of this invention. Generally, in FIG. 1, client 102 communicates with system 103 to generate a custom application based on a view of repository 104. The application may be, for example, a Java 2 Platform Enterprise Edition (J2 EE) Web application.

In certain embodiments, client 102 and system 103 may be software. For example, client 102 may be a front end of an application and system 103 may be the back end of the application.

In other embodiments, client 102 and system 103 include both software and hardware. For example, client 102 may be a personal computer or terminal and system 103 may be an application server. In another embodiment, client 102 may be software, e.g. a graphical user interface, and system 103 may be both software and hardware, e.g. an application backend and repositories and database storage devices.

In yet other embodiments, client 102 and/or system 103 may include a person or a business, and/or a combination of people, businesses, software and hardware. For example, client 102 may be a business manager or a web developer who requests an application from a development team. In another embodiment, client 102 may be a database application developer who requests generation of a custom application through an application.

Repository 104 is a database that stores data describing data stored one or more other databases, e.g. database 106. For example, repository 104 may store metadata describing user data in database 106. The metadata may be, for example, types of database elements (e.g. tables, columns and indexes) for a specific application version indicated within a schema.

Database 106 stores data, e.g. client contact information, account numbers, and the like. In certain embodiments, database 106 may be a relational database.

Both repository 104 and database 106 may operate under a variety of database and/or operating system platforms. Additionally, both repository 104 and database 106 may be stored across several storage devices in a distributive manner.

In block 112, client 102 sends a request to generate an application based on a view of repository 104. In one embodiment, client 102 may send this request using a user interface object, such as a menu, as will be described in more detail below.

In block 114, system 103 receives the request from client 102. In embodiments were client 102 is another computer, client 102 may communicate to system 104 via a network, for example. In embodiments were client 102 is a front end, client 102 may communicate to system 104 via an internal bus, for example. In embodiments were client 102 is an individual, client 102 may communicate to system 104 over, for example, a telephone, in person, or via an electronic communications medium, e.g. email, chat or instant messenger.

In block 116, in response to receiving the request in block 114, system 103 generates an application based on the view, as will be described in more detail below. System 103 may access repository 104 and database 106 to generate the application. In the embodiment shown, repository 104 and 106 are separate systems coupled to system 103. In other embodiments, repository 104 and database 106 may be separate from system 103 but part of the same system. In other embodiments, one or both repository 104 or database 106 may be part of system 103.

In block 118, after the application is generated, system 103 outputs one or more files. For example, system 103 may output one or more of the following files: JavaServer Pages (JSP), Active Server Pages (ASP), Java source files, Web Services Description Language (WSDL) files, Axis libraries, JavaServer Pages Standard Tag Library (JSTL) files, readme files, logs, data schemas, metadata reports, cascading style sheets (CSS) and images.

In certain embodiments, subsequent to outputting the file(s), system 103 may transmit a file to client 102 as shown in block 120. For example, system 103 may email, upload or otherwise transfer a file via a network or bus to client 102. This transfer may include transfer to intermediate systems for temporary storage, e.g. a central file server. In other embodiments, system 103 may generate a file directly in client 102, such as by outputting a file directly into a folder in client 102 without first outputting the file into system 103. In yet other embodiments, system 103 may notify client 102 of a file's availability for subsequent retrieval.

After receiving one or more files in block 122, client 102 may customize a file in block 124. For example, if a file is a sample JSP page, the file may be customized in client 102 to provide a certain look and feel for a branded user interface. In other embodiments, rather than modifying a sample file, code from the sample file (e.g. code to access and modify the database) may be extracted from the sample file for inclusion in a template or another file. The code may include, for example, functions and/or routines for viewing data in the database, modifying data in the database and/or requesting security permissions to view or modify data in the database.

The following provides variations and examples of various aspects of embodiments of the invention. It will be appreciated that the following variations and examples are not intended to be exhaustive or to limit the invention to the precise forms disclosed. These variations and examples are to provide further understanding of embodiments of the present invention.

Process

Figure 2:
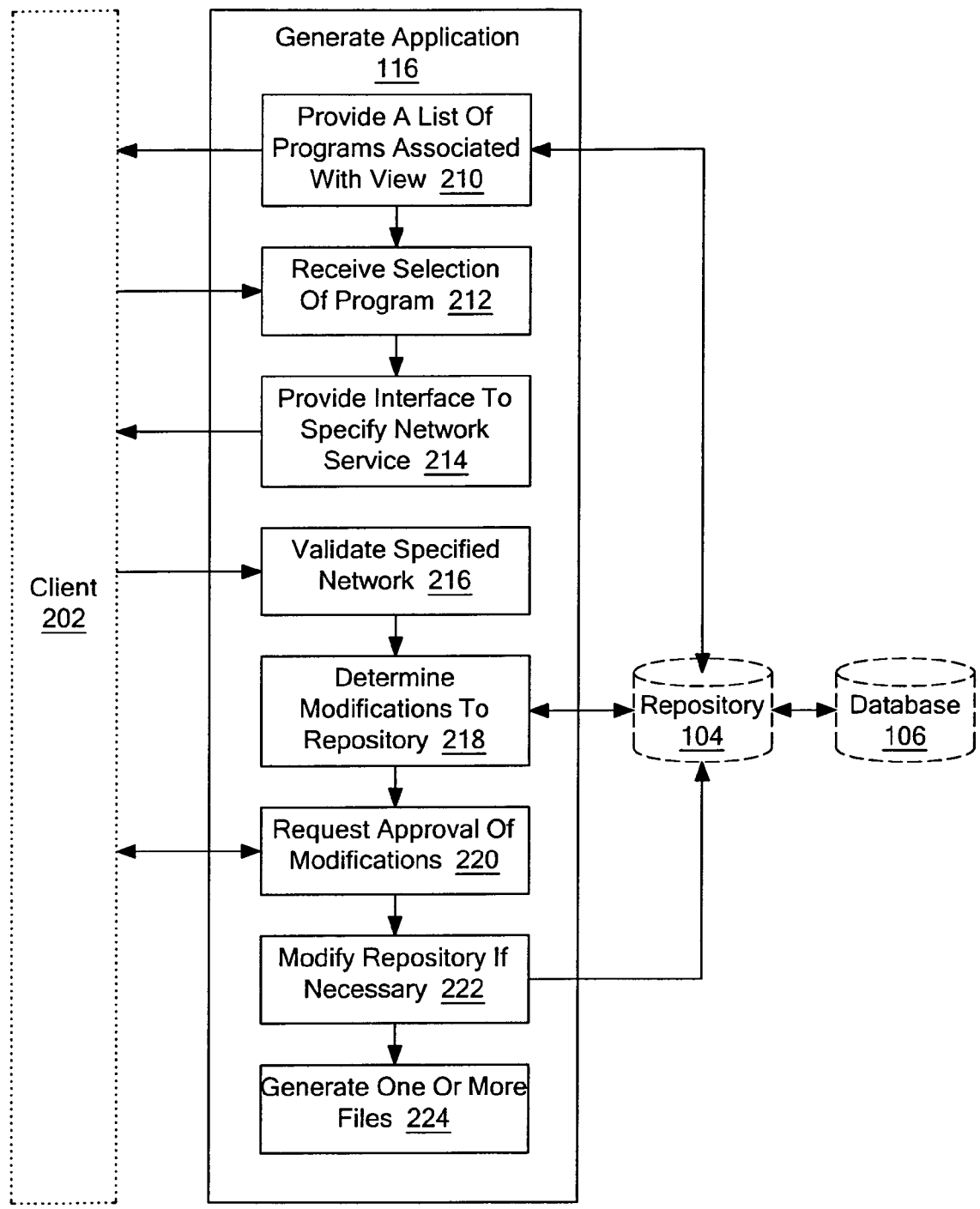

FIG. 2 is a diagram of part of the system shown in FIG. 1 in accordance with one embodiment of this invention. Specifically, FIG. 2 highlights details of block 116 (from FIG. 2) in accordance with one embodiment.

After receiving a request to generate an application based on a view of repository 104, in block 210, a list of programs associated with the view is provided to client 202. In certain embodiments, client 202 may be equivalent to client 102. In other embodiments, client 202 may be different. For example, in one embodiment, client 102 may be a business manager and client 202 may be a developer assigned to create a custom web application. In another embodiment, client 102 may be a separate program. For example, client 102 may be a program that, after completion of an event (e.g. the creation of a repository view), initiates a wizard for generating an application. Client 202 may be the front-end of that wizard.

A list of programs associated with the view may be obtained from repository 104. The list may include one or more programs, e.g. applets or servlets. In one embodiment, the list is divided. For example, the list may be divided into a list of parent applets and a list of child applets, as shown in FIG. 4C. In certain embodiments, the list of child programs may change dynamically with a selection of a parent program. In other embodiments, the list of child programs may change after submitting a selection of a parent program.

In block 212, a selection of one or more programs is received. In block 214, an interface, described in more detail below, is provided to allow client 202 to specify one or more network services (e.g. a web service) to be used by the application. In certain embodiments, the network service may already exist and may already be associated with the selected program(s) (e.g. applets). In certain embodiments, client 202 may have the option to create one or more new network services to be used by the application.

In block 216, subsequent to client 202 specifying one or more network services to be used by the application, the specified network services are validated. For example, a network service (e.g. a web service) that allows modification of a database may be validated to ensure that objects required to modify the database exist and are accessible. If the object does not exist, the object may be created, as will be described in more detail below.

In block 218, modifications to the repository are determined. For example, a field in the repository may need to be created to support the network service. For example, a selected program (e.g. an applet) may contain a First Name field, a Middle Name field, and a Last Name field. An integration component in an integration object used by a network service may map to a First Name field and a Last Name field, but may not map to a Middle Name field. In such an instance, the Middle Name field may be added to the integration component and the repository modified accordingly.

Before those modifications are committed to the repository, approval may be sought, e.g. from a user, in block 220. This approval may ensure that a sensitive repository is not accidentally altered, or altered without notification or authorization. In one embodiment, for example, a pop-up dialogue box may be presented (e.g. to a user of client 202) warning of proposed changes to the repository. Security measures may be taken (e.g. requesting a username and password) before alterations to the repository are made.

In certain embodiments, if approval for the changes to the repository is denied or otherwise fails, client 202 may be permitted to change a previous selection. For example, in one embodiment, a user may be permitted to return to previous dialogue box to change or create a different network service. In other embodiments, client 202 may be permitted to select a new view, a different program, or the like. In other embodiments, denying a request for approval may terminate or restart the process.

In block 222, modifications to the repository approved in block 220 are made. In block 224, one or more files are generated after approval is received. These files may include files previously described, e.g. JSP pages, WSDL files, reports and informational text files. For example, sample JSP pages may be generated to demonstrate the basic functionalities of the application. These sample JSP pages may present the selected view in New, Query and Edit modes using tag libraries, such as JSTL for J2EE or other tag libraries for other development environments. Extra JavaServer pages for login, non-list of value (non-LOV) picklists and multi-value group (MVG) fields may also be generated.

Additionally, one or more WSDL and Java class files may be generated. WSDL files may be generated to represent the business objects and components of the selected view. Files containing Java classes may be generated for session management. In certain embodiments, the java classes may be archived in a jar file, for example, J2 EE_Session_Manager. jar.

Additionally, one or more metadata report, readme.txt file, log file, Cascading Style Sheets (CSS) file and/or image files may also be generated. The metadata report may be an actuate report or a HTML file that provides metadata information of fields in an integration component. The readme.txt file may provide instructions on setup and use of the generated files, as well as WSDL mappings to each of the non-LOV picklist and MVG field. The log file may record errors and traces during code generation for tracing and debugging purposes. The CSS and image files may be used by the sample JavaServer pages to present a specific look.

Figure 3:
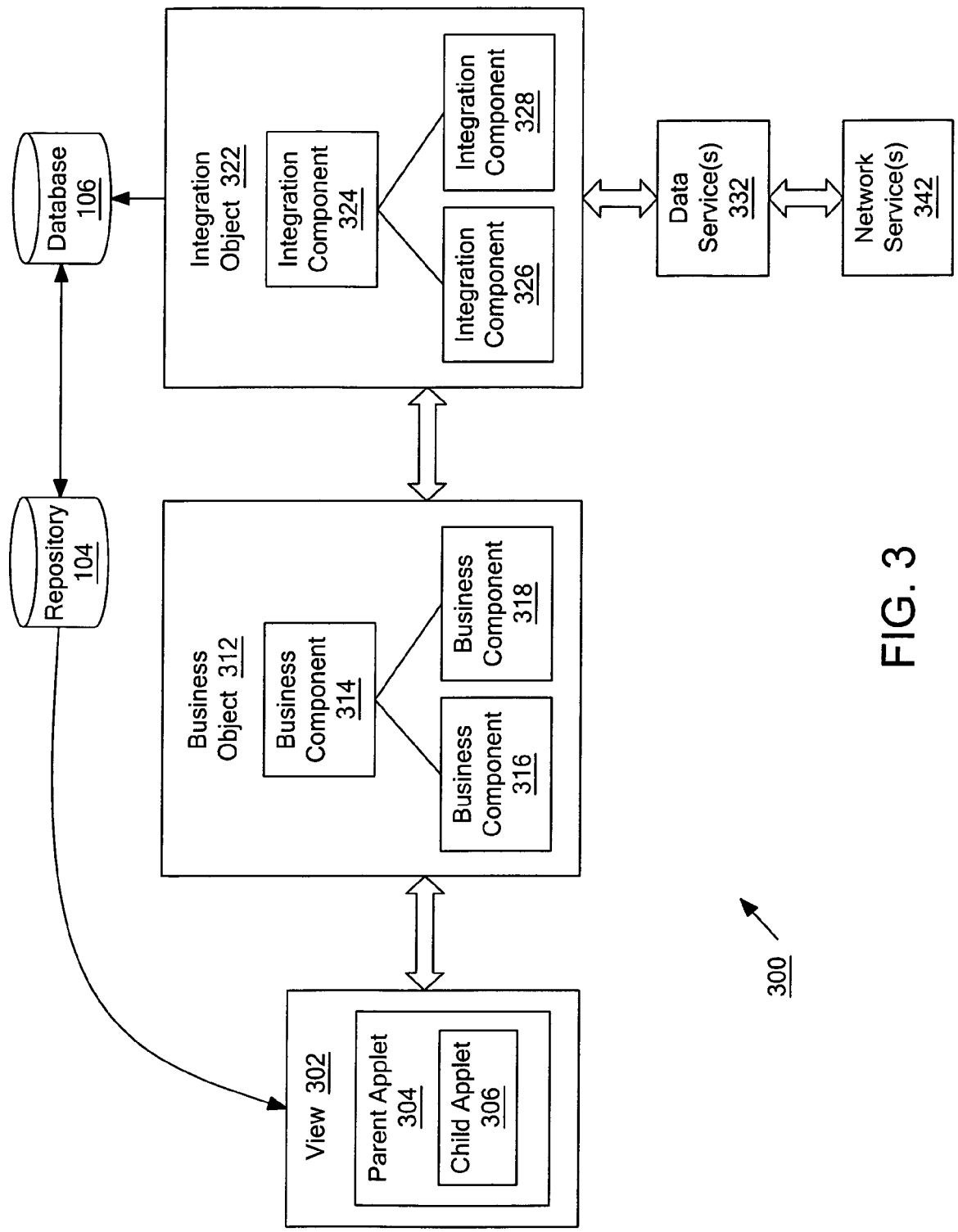

FIG. 3 is a diagram of relationships between components of a system that may be used to generate a custom application in accordance with one embodiment of this invention. Generally, in the embodiment of FIG. 3, when a custom application based on view 302 is requested, integration objects (e.g. integration object 322) used by the view to access database 106 are determined. Once determined, data services and network services which permit access those integration objects are determined. When the application is later executed, network service 342, data service 332 and integration object 322 are used to access the database.

Specifically, when a request to generate a custom application based on view 302 is received, view 302 is analyzed to determine which programs (e.g. applets 304 and 306) are associated with the view. View 302 is based upon data in repository 104. The data in repository 104 may be, for example, metadata that describes data in database 106, e.g. tables, columns and indexes for a given schema.

In FIG. 3, programs in view 302 map to business components in business objects. For example, parent applet 304 and child applet 306 in view 302 may map to business components 314 and 316, respectively, in business object 312.

Business objects (e.g. business object 312) logically define the relationship between a parent business component and one or more child business components. For example, a business object labeled "Account Business Object" may logically define the relationship between a parent business component labeled "Account Business Component" and children business components labeled "Contact," "Opportunities," and "Activities."

In FIG. 3, the relationship between business component 314 and business component 316 is shown by a connecting line. In FIG. 3, business object 312 also defines relationships for other business components, e.g. component 318. In certain embodiments, these other components may map to other child applets belonging to parent applet 304, which may or may not be selected, for example by a user in block 212 in FIG. 2. In other embodiments, these other business components may map to applets belonging to a different parent applet or applets associated with a different view.

In FIG. 3, the business components in business object 312 also map to integration components (ICs) in integration object (IO) 322. Specifically, business component 314 maps to integration component (IC) 324 and business component 316 maps to IC 326. Each integration component (IC) may map, for example, to one or more tables and/or joined tabled in database 106, e.g. by mapping to table properties or attributes. IO 322 may describe and/or define relationships (e.g. a relational hierarchy) between ICs and, therefore, between data in database 106. This relationship is shown in FIG. 3 by lines connecting IC 324 and IC 326.

In FIG. 3, IO 322 also describes and/or defines a relationship between IC 324 and IC 328. In certain embodiments, IC 328 may map to a business component in business object 312, but the business component may not be relevant to the application being generated. In other embodiments, IC 328 may map to a different business component in another business object. In yet other embodiments, IC 328 may not map to any business component.

In FIG. 3, after determining which applets are associated with the view, which business components are associated with the applets, and which integration components are associated with the business components, one or more data service(s) are determined. A data service provides one or more methods to query and/or manipulate database records, including adding, updating and/or deleting a record. For example, in FIG. 3, data service 332 is determined to use integration object 322 to access database 106.

In FIG. 3, network service(s) 342 are determined to map to data service(s) 332. In certain embodiments, network service(s) 342 may be created for use by the application being generated if desired. Network service(s) 342 may also be validated. Network service(s) 342 may be used by the generated application to access and modify database 106 over a network. For example, network service(s) 342 may be a web service that uses data service(s) 332 to access database 106 over the web. The access may be secured and may include permission to modify database 106, e.g. to add, delete or update certain data.

EXAMPLES

Figure 4A:
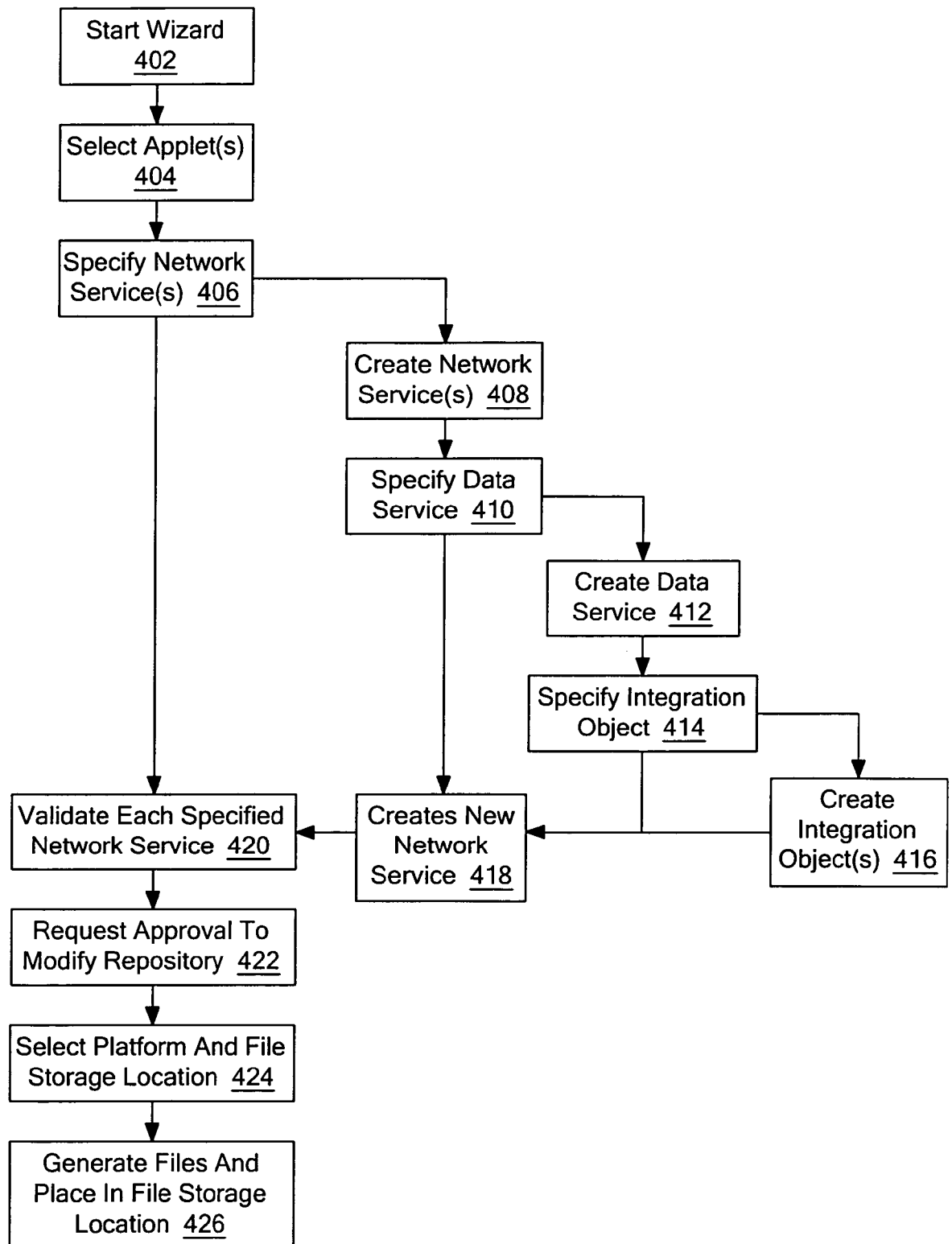
Figure 4C:
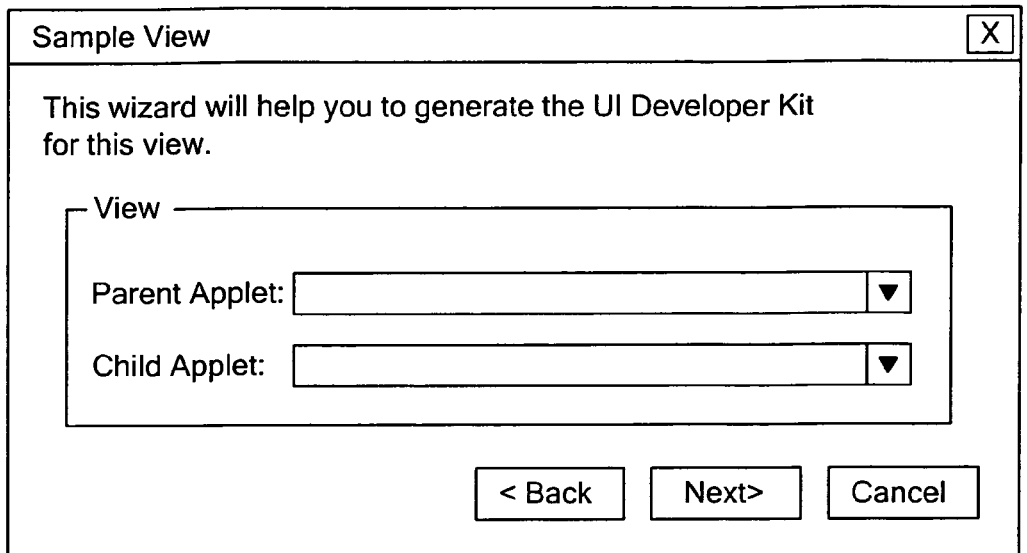

FIG. 4A is a flowchart of a user interface for generating a custom application in accordance with one embodiment of this invention. FIG. 4B-4H are screenshots of various points in the flowchart of FIG. 4A in accordance with embodiments of this invention.

In block 402, a wizard is started. This wizard may be started via a graphical user interface (GUI), e.g. an item on a pop-up or drop-down menu. FIG. 4B is a screenshot of one such interface in accordance with one embodiment of this invention. In FIG. 4B, an item called "Generate UI Kit" is included in a Context Menu of a View List Editor. Selection of this item invokes a wizard. In certain embodiments, the menu item may be disabled if the selected view is inactive or is not supported, or if a license has not enabled this feature.

In block 404, one or more applets are selected. In certain embodiments, a user may select these applets via a dialogue box provided by the wizard started in block 402. FIG. 4C is a screenshot of one such dialogue box allowing a user to select a parent applet and a child applet in accordance with one embodiment of this invention. The parent applet dropdown menu may display a list of applets that are based on the primary business component of the selected view. The child applet dropdown menu may show a list of child applets supported by the wizard, e.g. applets which use integration objects accessible through a network service. In one embodiment, the child applet dropdown menu may include an item labeled "None" to allow a user to not select any child applet. In one embodiment, a sample file (e.g. a JSP page) is generated at the end of the wizard based on these parent-child applets.

Figure 4D:
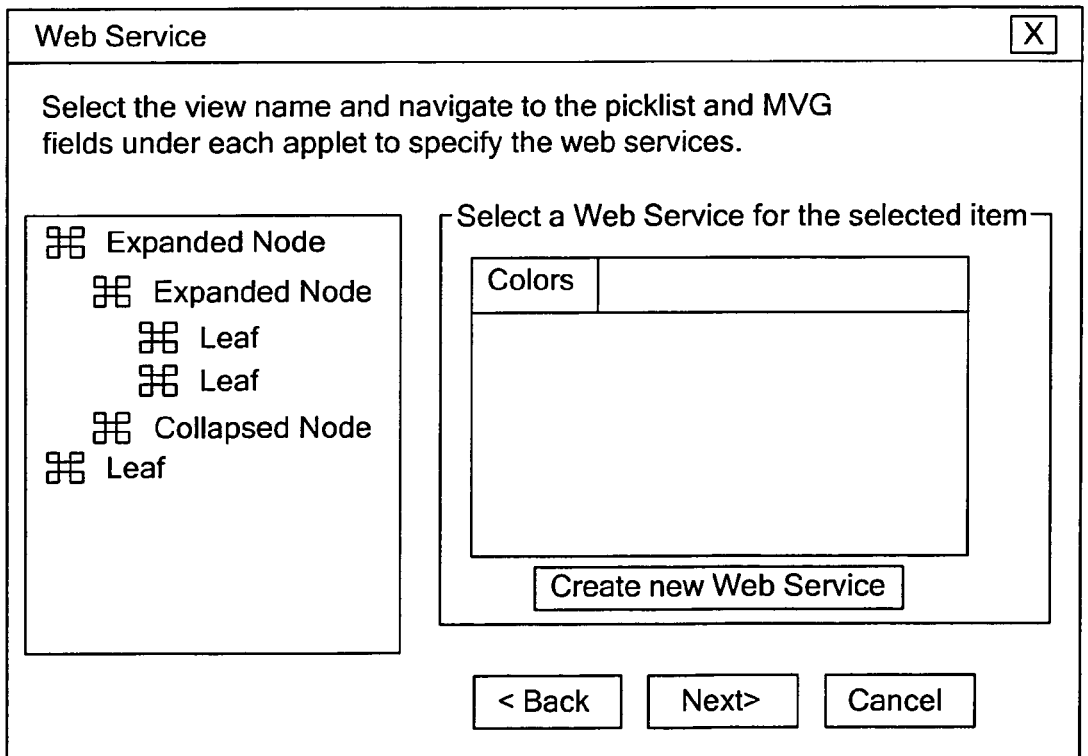

In block 406, one or more network services are specified. In certain embodiments, a user may select these network services via a dialogue box provided by the wizard started in block 402. FIG. 4D is a screenshot of one such dialogue box allowing a user to select one or more network services (in this example, one or more web services) in accordance with one embodiment of this invention. In FIG. 4D, on the left hand side of the dialogue box, a tree structure is shown. In one embodiment, the view name is displayed as the root node. In one embodiment, the root node has two child nodes that show the parent applet name and the child applet name. In one embodiment, non-LOV picklists and MVG fields defined in the business components and used by the selected view are shown as a sub-node under the applet.

In FIG. 4D, on the right hand side of the dialogue box, network services (in this example, web services) available and applicable to the selected view or field may be listed. In one embodiment, a network service that is available and validated is selected by default. In another embodiment, a network service that is available and validated is highlighted in the dialogue box for selection. In one embodiment, when a network service is selected, a sample server page (e.g. JSP page) generated in response to the wizard may include a writeable field. When no valid network service is selected, the sample server page may include a read-only field rather than the writeable field. In certain embodiments, the read/write attribute of the field may be logged in a readme file.

In block 408, one or more network services may be created. The dialogue box shown in FIG. 4D provides this option via a button entitled "Create new Web Service." A user may create a new network service (specifically, a new web service in this example) by clicking on this button.

Figure 4E:
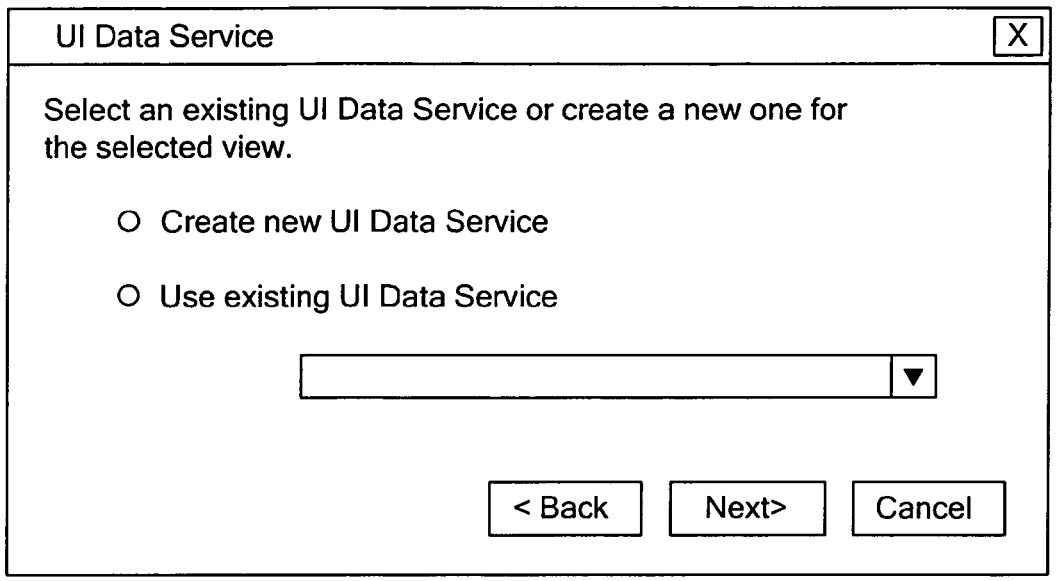

A data service is then to be specified, in block 410. In certain embodiments, a user may select one or more data services via a dialogue box provided by the wizard. FIG. 4E is a screenshot of one such dialogue box allowing a user to select or create a data service in accordance with one embodiment of this invention. In one embodiment, if a valid data service is available, the valid data service may be selected by default. In another embodiment, if a valid data service is available, the valid data service may be highlighted in the dialogue box for selection.

In block 412, if a new data service is created, an integration object may be specified in block 414 or created in block 416 for use by the data service. The new network service may then be created based on the data service in block 418.

Each network service specified is validated in block 420. In certain embodiments, a dialog may appear to indicate that validation for a selected network services is in progress. During validation, one or more data services may be tested and/or fields in integration objects analyzed. If errors are encountered during validation, modifications to the repository may be made.

Figure 4F:
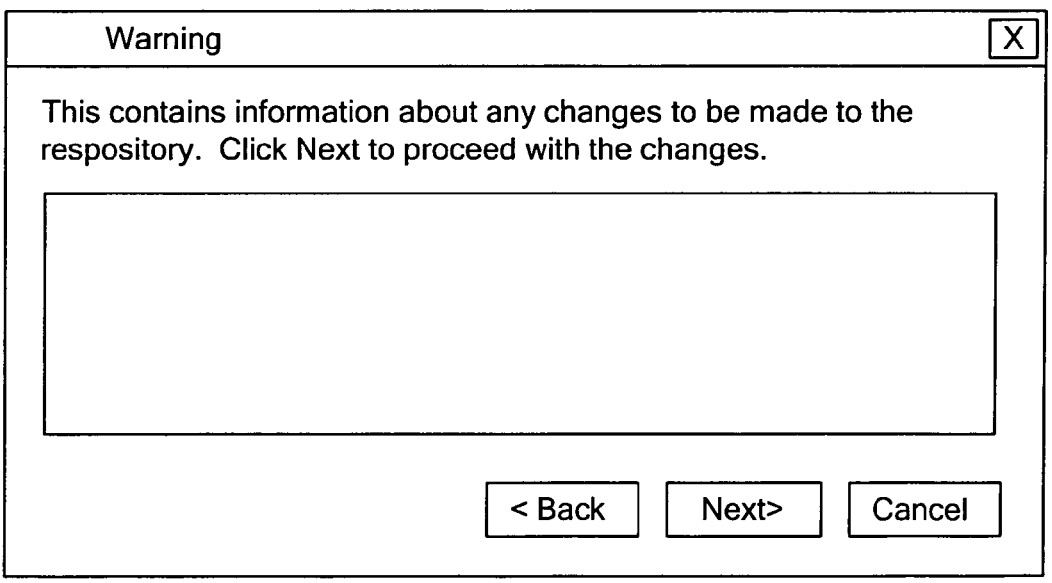

Approval to make these modifications may be requested, as shown in block 422. In certain embodiments, a user may approve the modifications via a dialogue box provided by the wizard. FIG. 4F is a screenshot of one such dialogue box in accordance with one embodiment of this invention. In one embodiment, the dialogue box in FIG. 4F may show errors and warnings encountered during the validation. When Next is clicked, changes may be written to the database to correct those errors. Alternatively, in FIG. 4F, a user may click on "Cancel" to terminate the wizard, or "Back" to return to a previous screen in the wizard. In addition, as previously suggested, authorization may be requested before the modifications are entered.

In block 424, a development platform on which to base the files and file storage location may be selected. In certain embodiments, a user may select the platform and/or storage location via a dialogue box provided by the wizard after validation of selected network services is complete. In other embodiments, a user may select platform and/or storage location at a different point in the process, e.g. before selecting applets, after selecting applets or after repository modifications.

Figure 4G:
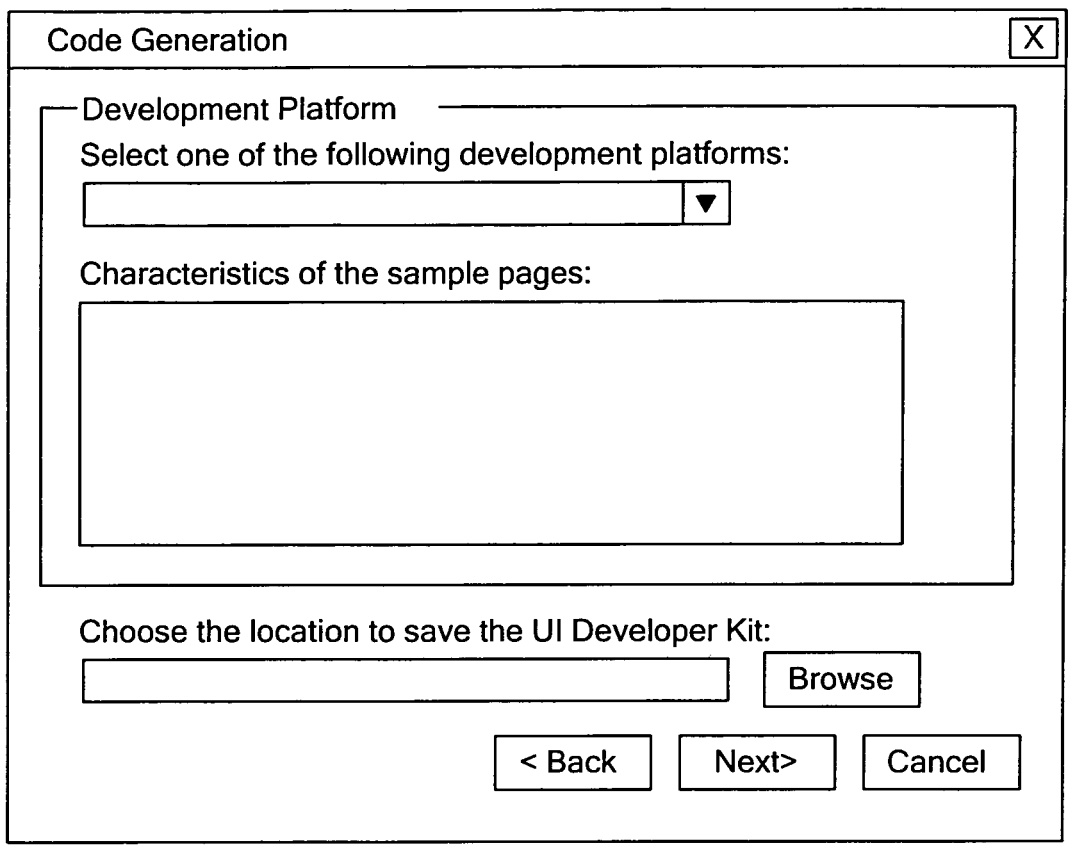

FIG. 4G is a screenshot of a dialogue box allowing a user to select a platform and a storage location for files in accordance with one embodiment of this invention. In one embodiment, the development platform selection menu shown in FIG. 4G is populated with options such as J2 EE, Platform A and Platform B.

In one embodiment, the field under the label "Characteristics of the sample pages" may be describe a type of proxy generator, tag library and/or controller associated with the development platform. For example, the table below lists characteristics that may populate the field, depending on the development platform highlighted in the platform selection menu.

|  | J2EE | Platform A | Platform B |
| --- | --- | --- | --- |
| Proxy generator | Axis 1.1 WSDL2Java | Proxy generator A | Proxy generator B |
| Tab library | JSTL | Tab library A | Tab library B |
| Controller | JavaServer Pages | Controller A | Controller B |

In certain embodiments, one or more sample files (e.g. JavaServer pages) may be generated based on the proxy generator, tab library and controller type of the development platform selected. For example, different files would be generated for J2 EE than would be generated for Platform A or Platform B. Therefore; embodiments of this invention may be used with a variety of platforms.

Figure 4H:
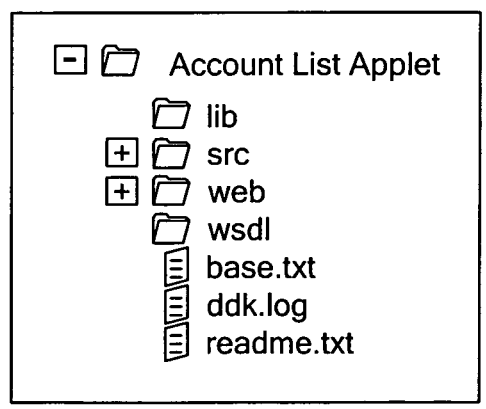

In block 426, these and other files may be generated and placed in the storage location selected. FIG. 4H is a screenshot of a file structure of files generated in block 426 in accordance with one embodiment of the invention. As shown in FIG. 4H, these files include library files, source files (e.g. Java source files), web files (e.g. Hyper Text Markup Language (HTML) files), and WSDL files. In addition, in the embodiment shown in FIG. 4H, these files include text and log files.

These files allow a developer to customize a front-end, e.g. for a branded look and feel, while working with more familiar interfaces that may be applicable across various databases, database applications and platforms. For example, the developer may work with Java rather than eScript/Siebel VB. Thus, using embodiments of this invention, a developer may efficiently deploy an application, e.g. a web application, that provides database functionality while maintaining control of and flexibility in the look and feel of the deployed application.

In addition, because the application may be generated using previously defined or created views, these previously defined or created views may be leveraged to reduce deployment time. Specifically, the business objects, integration objects, data services and network services previously created and associated with the previously defined view may be leveraged to significantly reduce the application's development, and therefore, deployment time.

Furthermore, in certain embodiments, some or all of these objects and/or services may be automatically selected based upon a selected view. This allows a user to generate a working application to access and modify a database while having little or no knowledge of the underlying database and/or repository structure.

Moreover, in certain situations, such as where the generated application is to be used as a proof-of-concept, the generated application files, e.g. sample JSP files, may be used without customization. Therefore, in certain situations, a developer may not write and debug any code and still achieve the business objectives.

FIG. 5A is a screenshot of a sample JSP file generated in accordance with one embodiment of this invention. The sample JSP file includes a function named "Login" which returns a string. This function provides the database with security protection, e.g. protecting the database from unauthorized modification. FIG. 5B is a screenshot of a portion of the file of FIG. 5A when executed by a processor in accordance with one embodiment of this invention. Specifically, FIG. 5B is a screenshot of a web application applet encoded in the sample JSP file of FIG. 5A. A developer may or may not have modified colors, formatting and/or table properties to arrive at the JSP page shown in FIG. 5B.

FIGS. 6A-6C are consecutive screenshots of an application generated in accordance with one embodiment of this invention. In FIG. 6A, various accounts are listed, e.g. Toys R Us, Fidelity, and Epiphany. The data for this list is taken from a database, e.g. database 106, using one or more network services, data services or integration objects. In FIG. 6B, one account is selected for viewing, e.g. Toys R Us. If a user selects to edit this account, he or she may do so using a button on the JSP page, for example. FIG. 6C shows a result of a user selecting to edit the account shown FIG. 6B. Therefore, using the application generated, a user may modify data in a database.

In one example of an application of one embodiment of this invention, a web application developer is responsible for created web pages which display service requests. The web application developer is unfamiliar with the CRM application which currently provides access to this information. The web application developer communicates the business needs to a CRM application developer.

The CRM application developer finds a Service Requests View that displays data useful for the Custom Application. Base on this view, the CRM application developer launches a wizard to guide the CRM application developer through selection of one or more network services (e.g. Web Services), Data Services, Integration Objects and platforms. As a result of the wizard, files such as WSDL files, sample JavaServer pages, readme.txt, CSS, and the like are generated and placed in a file folder specified by the developer. The CRM application developer may archive the files and transfer the archive to the web application developer.

The web application developer may follow the instructions described in the readme.txt file, run an integrated development environment (IDE) tool to generate proxy objects from the WSDL files and import sample JavaServer pages to the IDE. The web application developer may test and deploy the sample JavaServer pages to learn how to integrate CRM logic and business service into the custom application.

Systems

Figure 7:
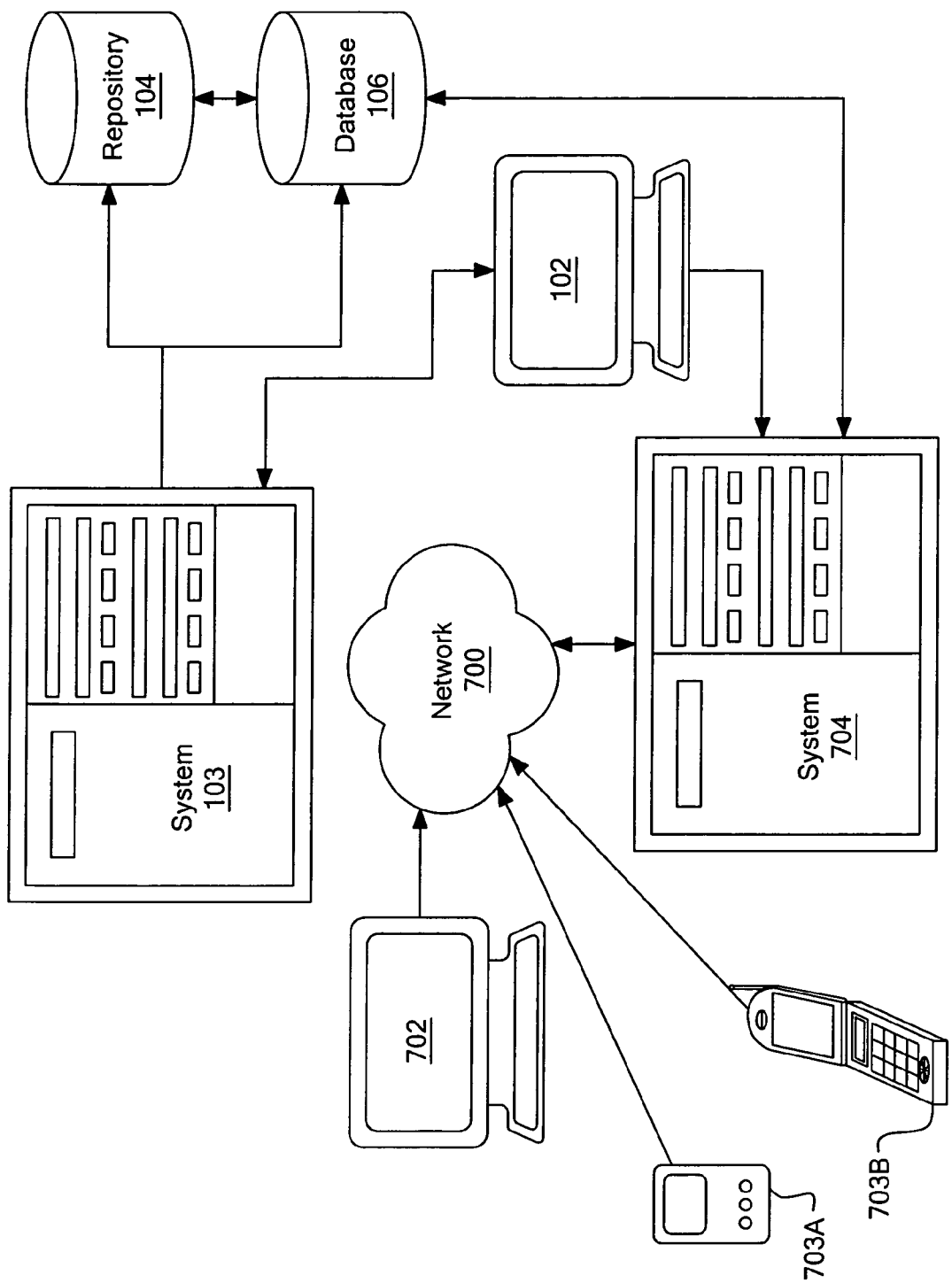

FIG. 7 is a diagram of a system for generating a custom application in accordance with one embodiment of this invention. While FIG. 7 illustrates various components of a network system, it is not intended to represent any particular architecture or manner of interconnecting the components as such details are not germane to the present invention. Other systems that have fewer or more devices may also be used with the present invention.

In the embodiment shown in FIG. 7, system 102 sends a request to system 103 to generate of a custom application. In certain embodiments, system 102 may be connected to system 103 via a network connection, serial connection, parallel connection, Universal Serial Bus (USB) connection or the like. System 103 receives the request and generates an application to modify database 106 based on a view of repository 104 as previously discussed. In the embodiment of FIG. 7, files generated as a result of the request to generate a custom application are transferred to system 102. Customization, testing and the like may be completed in system 102 before deployment of the files to server 704. In other embodiments, the files may be transferred to, customized and/or tested on another system, instead of or in addition to system 102, before deployment to server 704.

Server 704, e.g. a web server, provides access to the custom application to devices and/or system connected via network 700. For example, server 704 may provide access to the application to computer 702, personal digital assistant 703A, 703B and mobile phone 704. Server 704 may also request a secure network connection before providing access to the application, e.g. through a virtual provide network (VPN) connection or secure shell (SSH) connection.

Network 700 may be a wide area network (WAN), such as the Internet. In other embodiments, network 700 may also be a metropolitan area network (MAN), such as those used on college campuses, a local area network (LAN), such as those used within an office building or household, or a personal area network (PAN), such as those used between wireless computer peripherals.

Network 700 may use a number of communications protocols, including various combinations of protocols at different open systems interconnection (OSI) model levels. For example, network 700 may use integrated services digital network (ISDN), point-to-point protocol (PPP), X.25 , internet protocol (IP), transmission control protocol (TCP), user datagram protocol (UDP), file transfer protocol (FTP), and hypertext transfer protocol (HTTP).

In addition, the signals transmitted through network 700 may travel through landlines, airwaves, or a combination thereof. In certain embodiments, network 700 may conform to wireless communications standards such as Bluetooth and the Institute of Electrical and Electronics Engineers (IEEE) 802 standards, e.g. IEEE std. 802.11g-2003 , published Jun. 27, 2003.

In addition, network 700 may include devices such as satellites, gateways and routers. For example, network 700 may be a telecommunications network which includes devices to transmit and receive signals from a mobile telephone client through an access tower, to a satellite, down to a base station, through a land-base telephone line and to a computer. In such an embodiment, the mobile telephone client may display the advertisement obtained by offering system 700.

As another example, network 700 may be a computing network which includes devices to transmit and receive signals from a console, through a wireless adapter, to a router, through a broadband modem, to an ISP network of computers, through the Internet backbone and back through another set of devices to a data storage device.

Figure 8:
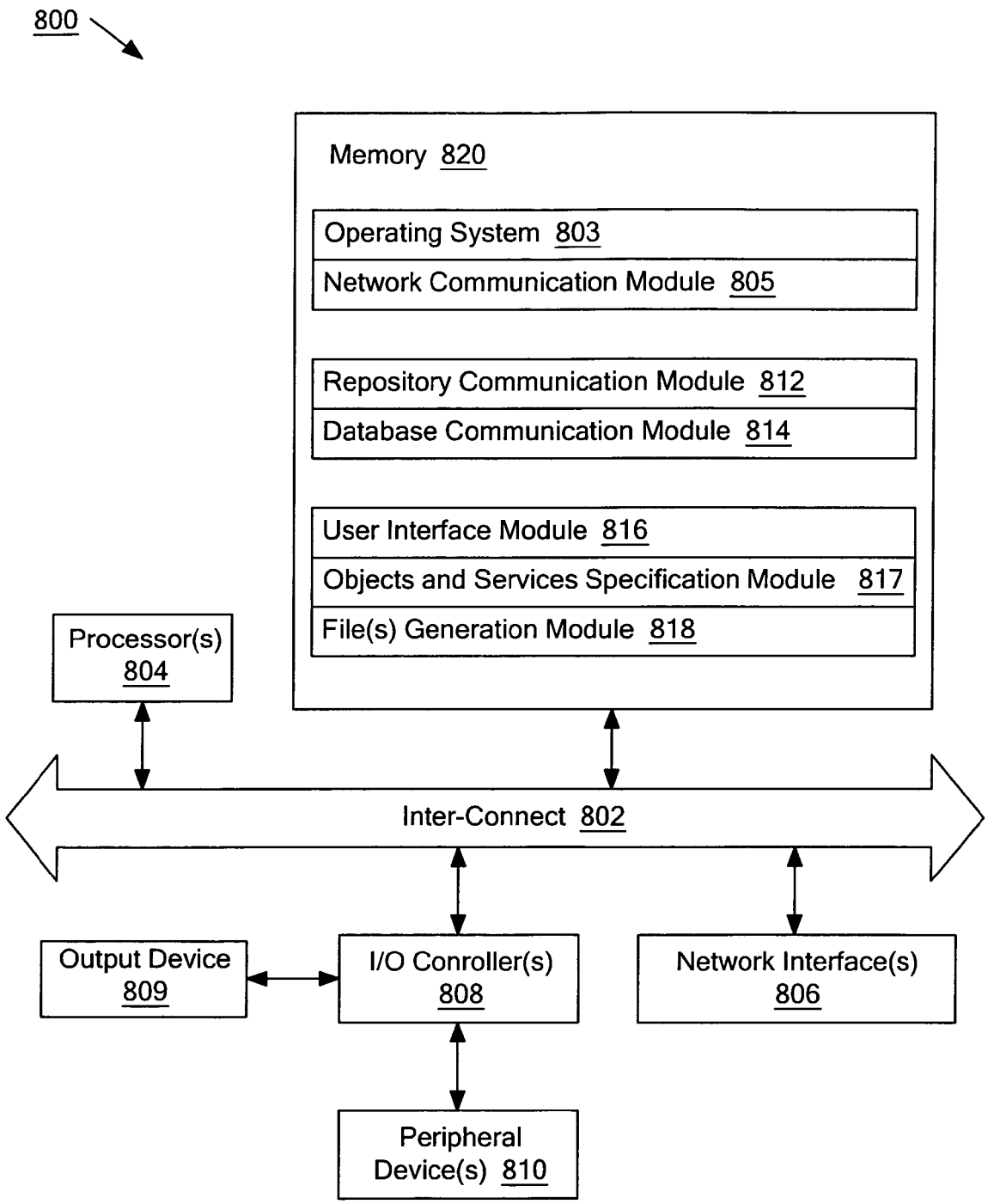

FIG. 8 is a diagram of a system for generating a custom application in accordance with another embodiment of this invention. While FIG. 8 illustrates various components of a computer system, it is not intended to represent any particular architecture or manner of interconnecting the components as such details are not germane to the present invention. Other systems that have fewer or more components may also be used with the present invention. Furthermore, some components described above with reference to FIG. 7 may also be employed in FIG. 8.

In FIG. 8, the embodiment includes an inter-connect 802 (e.g., bus and system core logic) to interconnect memory 820 and one or more processor(s) 804, which may be coupled to a cache memory (not shown). Processor(s) 804 may execute instructions stored in memory 820. Inter-connect 802 further interconnects processor(s) 804 and memory 820 to one or more devices 809 and 810 via one or more input/output (I/O) controller(s) 808. In certain embodiments, output device 809 may be a visual output device (e.g. a monitor) or an audio output device (e.g. speakers). Inter-connect 802 may include one or more buses coupled to one another through various bridges, controllers, and/or adapters. In one embodiment the I/O controller 808 may include a USB adapter for controlling USB peripherals, an IEEE-1394 bus adapter for controlling IEEE-1394 peripherals, and the like.

Memory 820 may include Read Only Memory (ROM), volatile Random Access Memory (RAM), and non-volatile memory, such as hard drive, flash memory, etc. Volatile RAM is typically implemented as dynamic RAM (DRAM) which requires power continually in order to refresh or maintain the data in the memory. Non-volatile memory typically includes a magnetic hard drive, a magnetic optical drive, or an optical drive (e.g., DVD RAM), or other type of memory system which maintains data even after power is removed from the system. The non-volatile memory may also include a random access memory. Further, the non-volatile memory may include a local device coupled directly to other components in the data processing system. A non-volatile memory that is remote from the system, such as a network storage device coupled to the data processing system through a network interface such as a modem or Ethernet interface, may also be used.

Memory 820 includes instructions for an operating system 803. The operating system 803 may include procedures for handling various basic system services and for performing hardware dependent tasks. Examples of the operating system 803 include LINUX, UNIX, Windows, OS/390 , OS/400 , and the like.

In one embodiment, memory 820 further includes instructions for network communication module 805. Network communication module 805 is configured with a host/computer name and an internet protocol (IP) address and stores a media access control (MAC) address of a network interface device. The network communication module 805 may include instructions used for connecting the system 800 to other computing devices via wired and/or wireless network/communication interface(s) 806 to networks such as the Internet, a WAN, a LAN, a MAN, or the like.

In one embodiment, memory 820 further includes instructions for repository communications module 812. Repository communications module 812 may include instructions for accessing and modifying a repository, e.g. repository 104 (not shown). For example, repository communications module 812 may include instructions for accessing repository 104 to retrieve views of database 106. Repository 104 may be part of system 800 or may be coupled to system 800 via network interface(s) 806.

In one embodiment, memory 820 further includes instructions for database communication module 814. Database communication module 814 may include instructions for accessing and modifying a database, e.g. database 106 (not shown). Database 106 may also be part of system 800 or may be coupled to system 800 via network interface(s) 806.

In one embodiment, memory 820 further includes instructions for user interface module 816. User interface module 816 may include instructions for displaying graphical user interfaces, including but not limited to dialogue boxes for a wizard to allow a user to select views, applets, services and the like. User interface module 816 may output to peripheral device(s) 809 or device 810 via I/O controller 808. User interface module 816 may also output to other devices connected to system 800 via network/communication interface(s) 806.

In one embodiment, memory 820 further includes instructions for objects and services specification module 817. Objects and services specification module 817 may include instructions for mapping views to business objects and for mapping those business objects to integration objects. Module 817 may also include instructions for mapping programs (e.g. applets) to specific business components and for mapping those business components to integration components. Additionally, module 817 may include instructions for handling data and network services. For example, objects and services specification module 817 may include instructions for mapping, specifying and/or creating data services and network services. In certain embodiments, services specification module 817 may also include instructions for creating integration objects for use by a data service. Module 817 may also communicate with repository communication module 812 and/or database communication module 814 to validate services and integration objections.

In one embodiment, memory 820 further includes instructions for file(s) generation module 818. File(s) generation module 818 may include instructions for generating files, e.g. JSP files, WSDL files, and the like. File(s) generation module 818 may communicate with user interface module 816 and/or objects and services specification module 817 to obtain information to generate the files, e.g. platform information and file storage location. In one embodiment, file(s) generation module 818 may communicate with network communication module 805 to transmit the files to another system. In one embodiment, file(s) generation module 818 may communicate with user interface module 816 to list the resulting files to a user via output device 809 or peripheral device(s) 810.

CONCLUSION

In the above detailed description, numerous specific details are set forth in order to provide a thorough understanding of the present invention. However, it will be apparent to one of ordinary skill in the art that these specific details need not be used to practice the present invention. In other circumstances, well-known structures, materials, or processes have not been shown or described in detail in order not to unnecessarily obscure the present invention.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

Reference to a "list of value" (LOV) picklist as used herein includes a dropdown picklist or menu. Reference to a "non-list of value" (non-LOV) picklist as used herein includes a picklist or menu which is not down in a dropdown user interface, but instead shown in a separate object, e.g. a page or dialogue box.

Reference to a "multi-value group" (MVG) as used herein includes a child business component that relates to a parent business component.

Reference to a "client" as used herein may include any system that accesses a service on another system by some kind of network. These clients include, but are not limited to, terminals, personal computers, thin clients, personal digital assistants (PDAs), mobile telephones, pagers, wireless handheld devices, game consoles and televisions.

Reference to a "server" as used herein may include a software application that carries out tasks on behalf of users such as file serving, application serving, web serving, mail serving, email serving, image server, and the like. The term server as used herein also includes any physical device on which such software is executed, such as a mainframe, a minicomputer, a personal computer, a dedicated server machine, and the like.

The techniques shown in the figures can be implemented using code and data stored and executed on computers. Such computers store code and data using machine-readable storage media, such as magnetic disks; optical disks; random access memory (RAM); read only memory (ROM); flash memory devices; and the like. Such computers communicate code and data using electrical, optical, acoustical or other form of propagated signals, both internally and with other computers over a network.

Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD ROMs and magnetic optical disks, read only memories, random access memories RA, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example.

Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc. . . . ) as taken in action or causing a result. Such expressions are merely a shorthand way of saying that execution of the software by a computer causes the processor of the computer to perform an action or produce a result.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method comprising:
   receiving a request at a computing system, wherein
      the request is configured to cause the computing system to generate an application configured to be used in modifying a first database; and
   in response to the receiving the request, generating the application using the computing system, wherein
      the application is based on a previously defined view of a second database coupled to the computing system, and
      the generating comprises
         specifying an integration object used by the previously defined view of the second database to access the first database,
         determining a modification to the second database in response to validating a network service for use with the integration object, and
modifying the second database by causing the computing system to write the modification to the second database.

2. The method of claim 1, wherein the generating further comprises
   providing a list of programs associated with the previously defined view of the second database, and
   receiving a selection from the list of the programs, wherein
      the selection represents an applet,
      the applet is based on a primary business component of the previously defined view of the second database, and
      the applet accesses the integration object through the network service.

3. The method of claim 1, wherein the generating further comprises
   specifying a data service, wherein
      the specifying the data service further comprises the specifying the integration object.

4. The method of claim 1, further comprising
specifying the network service, wherein the specifying the network service further comprises at least one of
   specifying a valid and available network service, and
   creating a new network service, and
   validating the new network service.

5. The method of claim 1, wherein
the generating further comprises
requesting an approval to modify the second database, and
selecting
   a platform, and
   a file storage location.

6. The method of claim 1, wherein
the specifying the integration object further comprises creating the integration object, and
the integration object is used to access the first database.

7. The method of claim 1, wherein
the application is a web application,
the generating the application is performed in response to a selection of the previously defined view from a list of previously defined views,
the modifying the first database includes one or more of adding, updating and deleting data stored in the first database,
the second database stores metadata describing data in the first database,
the generating the application includes generating a set of files comprising a JavaServer Page (JSP) file, a Java source file, a Web Services Description Language (WSDL) file and a library file, and
the WSDL file is for generating Java proxy objects.

8. A machine-readable storage medium, having stored thereon a set of instructions executed by a processor, coupled to the machine-readable storage medium, to perform a method comprising:
   receiving a request to generate an application for modifying a first database; and
   in response to the request, generating the application based upon a previously defined view of a second database, wherein
      the generating further comprises
         specifying an integration object used by the previously defined view of the second database to access the first database,
         determining a modification to the second database in response to validating a network service for use with the integration object, and
         modifying the second database by writing the modification.

9. The machine-readable storage medium of claim 8, wherein the generating further comprises
   providing a list of programs associated with the previously defined view of the second database, and
   receiving a selection from the list of the programs, wherein
      the selection represents an applet,
      the applet is based on a primary business component of the previously defined view of the second database, and
      the applet accesses the integration object through the network service.

10. The machine-readable storage medium of claim 8, wherein
   the generating further comprises
      specifying a data service, wherein
         the specifying the data service further comprises the specifying the integration object.

11. The machine-readable storage medium of claim 8, further comprising
specifying the network service, wherein the specifying the network service further comprises at least one of
specifying a valid and available network service, and creating a new network service, and
validating the new network service.

12. The machine-readable storage medium of claim 8, wherein
the specifying the integration object further comprises creating the integration object, and
the integration object is used to access the first database.

13. The machine-readable storage medium of claim 12, wherein
the application is a web application,
the generating the application is performed in response to a selection of the previously defined view from a list of previously defined views,
the modifying the first database includes one or more of adding, updating and deleting data stored in the first database,
the second database stores metadata describing data in the first database,
the generating the application includes generating a set of files comprising a JavaServer Page (JSP) file, a Java source file, a Web Services Description Language (WSDL) file and a library file,
the WSDL file is for generating Java proxy objects.

14. The machine-readable storage medium of claim 8, wherein the generating further comprises:
requesting approval of the modification before modifying the second database.

15. The machine-readable storage medium of claim 8, wherein the generating includes generating a customizable file having code to modify the first database.

16. A system, comprising:
a processor;
request receiving means, stored in a machine-readable storage medium, for causing said processor to receive a request to generate an application for modifying a first database; and
application generating means, stored in the machine-readable storage medium, for causing said processor to, in response to the request, generate the application based upon a previously defined view of a second database, wherein the application generating means further comprises
integration object specifying means for specifying an integration object used by the previously defined view of the second database to access the first database,
modification determining means for determining a modification to the second database in response to validating a network service for use with the integration object, and
database modifying means for modifying the second database by writing the modification.

17. The system of claim 16, wherein the application generating means further comprises:
list providing means for causing said processor to provide a list of programs associated with the previously defined view of the second database, and
selection receiving means for causing said processor to receive a selection from the list of the programs, wherein the selection represents an applet,
the applet is based on a primary business component of the previously defined view of the second database, and
the applet accesses the integration object through the network service.

18. The system of claim 16, wherein the application generating means further comprises
data service specifying means for causing said processor to specify a data service, wherein
the data service specifying means further comprises the integration object specifying means.

19. The system of claim 16, wherein the application generating means further comprises
network service specifying means for causing said processor to specify the network service, wherein the network service specifying means further comprises
one of the set of
valid network service means for causing said processor to specify a valid and available network service, and
new network service means for causing said processor to create a new network service, and
causing said processor to validate the new network service.

20. The system of claim 16, wherein the application generating means further comprises
approval means for causing said processor to request an approval to modify the second database, and
delivery selection means for causing said processor to select
a platform, and
a file storage location.

21. The system of claim 16, wherein the application generating means further
integration object creating means for causing said processor to create the integration object.

* * * * *

UNITED STATES PATENT AND TRADEMARK OFFICE
CERTIFICATE OF CORRECTION

PATENT NO. : 7,603,375 B2  Page 1 of 1
APPLICATION NO. : 11/095443
DATED : October 13, 2009
INVENTOR(S) : Bobby Ng et al.

It is certified that error appears in the above-identified patent and that said Letters Patent is hereby corrected as shown below:

On the Title page, Item (75), in "Inventors", line 6, delete "Rita Chang," and insert -- Che Yee Chang, --, therefor.

On the Title page 2, Item (56), under "Other Publications", line 1, delete "Achitecture" and insert -- Architecture --, therefor.

On sheet 15 of 15, in Figure 8, Box 808, line 1, delete "Conroller(s)" and insert -- Controller(s) --, therefor.

In column 2, line 43, delete "FIG." and insert -- FIGS. --, therefor.

In column 6, line 9, delete "J2 EE" and insert -- J2EE --, therefor.

In column 7, line 2, delete "IO" and insert -- (IO) --, therefor.

In column 7, line 6, delete "IO" and insert -- (IO) --, therefor.

In column 7, line 40, delete "FIG." and insert -- FIGS. --, therefor.

In column 9, line 14, delete "J2 EE," and insert -- J2EE, --, therefor.

In column 9, line 36, delete "J2 EE" and insert -- J2EE --, therefor.

In column 9, line 37, delete "Therefore;" and insert -- Therefore, --, therefor.

In column 11, line 38, delete "X.25 ," and insert -- X.25, --, therefor.

In column 11, line 47, delete "802.11g-2003 ," and insert -- 802.11g-2003, --, therefor.

In column 12, line 43, delete "OS/390 , OS/400 ," and insert -- OS/390, OS/400, --, therefor.

Signed and Sealed this

Tenth Day of August, 2010

David J. Kappos
*Director of the United States Patent and Trademark Office*